ASSOCIATIVE MEMORY OF MULTI-PLANE COMMON SOLENOID MATRICES

DONALD B. BRICK
and GEORGE G. PICK
INVENTORS.

BY

ATTORNEY.

DONALD B. BRICK
and GEORGE G. PICK
INVENTORS.

BY Spencer E. Olson
ATTORNEY.

Dec. 27, 1966 D. B. BRICK ET AL 3,295,110

ASSOCIATIVE MEMORY OF MULTI-PLANE COMMON SOLENOID MATRICES

Filed Aug. 16, 1963 7 Sheets-Sheet 3

DONALD B. BRICK
and GEORGE G. PICK
INVENTORS.

BY Spencer E. Olson

ATTORNEY.

Dec. 27, 1966 D. B. BRICK ETAL 3,295,110

ASSOCIATIVE MEMORY OF MULTI-PLANE COMMON SOLENOID MATRICES

Filed Aug. 16, 1963 7 Sheets-Sheet 4

DONALD B. BRICK
and GEORGE G. PICK
INVENTORS.

BY Spencer E. Olson

ATTORNEY.

ASSOCIATIVE MEMORY OF MULTI-PLANE COMMON SOLENOID MATRICES

Filed Aug. 16, 1963 7 Sheets-Sheet 5

DONALD B. BRICK
and GEORGE G. PICK
INVENTORS.

BY Spencer E. Olson

ATTORNEY.

DONALD B. BRICK
and GEORGE G. PICK
INVENTORS.

BY Spencer E. Olson
ATTORNEY.

DONALD B. BRICK
and GEORGE G. PICK
INVENTOR.

BY Spencer E. Olson
ATTORNEY.

United States Patent Office 3,295,110
Patented Dec. 27, 1966

3,295,110
ASSOCIATIVE MEMORY OF MULTI-PLANE COMMON SOLENOID MATRICES

Donald B. Brick and George G. Pick, Lexington, Mass., assignors to Sylvania Electric Products Inc., a corporation of Delaware Filed Aug. 16, 1963, Ser. No. 302,633
15 Claims. (Cl. 340—172.5)

This invention is concerned with electronic data processing apparatus and particularly with memory systems of the associative class useful in such apparatus.

An associative memory is one in which a word of data is retrieved on the basis of part or all of the data content of the stored word, known as the identifier or tag. Alternatively, this may be in the form of additional bits added to the data word. Thus, such a memory differs from one of the usual class of memories in which the address of the memory location storing the desired words is specified and read out. In the associative memory these locations must be found by first searching all locations for data which matches the identifier and then reading out only those matching locations.

An associative memory system has appreciable value in the solution of information retrieval problems. For instance, consider the hypothetical case in which it is necessary to supply information to the plant design engineers regarding those transistors on the market which have a certain power rating. There will be stored in memory data on each market item available, such as manufacturer, identifying number, voltage rating, current rating, power rating, size, etc. Consequently, using the power rating as the identifier from a requesting device, the memory would be searched and the stored information for all those transistors having this rating located and read out at high speed.

One problem which exists with present day associative memories is the distinguishing of a match condition from a mismatch. For example, a magnetic associative memory system was described by McDermid and Petersen in the "IBM Journal of Research and Development," in January 1961, which uses a nondestructive read element such as a magnetic toroid as its basic storage cell. There are four possible outputs from each storage element: a small negative signal when a ZERO is stored and the interrogation is for a ZERO; a large negative signal when a ONE is stored and the interrogation is for a ZERO; a small positive signal when a ONE is stored and the interrogation is for a ONE: and, a large positive signal when a ZERO is stored and the interrogation is for a ONE. Thus, under the condition of a mismatch between the stored information and the interrogating information, a large signal is generated but it may be either positive or negative. The detecting unit, therefore, must be capable of distinguishing between a small and a large signal for each polarity. This could become further complicated if memory noise were to subtract from the amplitude of these large signals and add to the amplitude of the small signals.

It has also been difficult to dismantle associative memories in order to repair them or to change the contents of non-volatile memories because of the large number of external connections to their component planes. This problem will become more pronounced in the future as present memories are replaced, due to circuit miniaturization, by memories of greater data content but smaller physical dimension.

Accordingly, a primary object of the present invention is to provide an associative memory which generates a match indication which is markedly distinguishable from a mismatch indication.

Another object of the invention is to provide an improved means for searching a high-speed associative memory.

A further object of the invention is to provide an improved means for reading out selected data locations in a high-speed memory.

Another object of the invention is to provide improved electronic data processing apparatus and memory storage means.

A still further object of the invention is to provide an associative memory unit having very few external connections to the memory planes so that they may easily be dismantled for repairing or data changing.

Yet another object of the invention is to provide an improved associative memory unit which is capable of storing large amounts of data in a comparatively small space.

These and related objects are accomplished in one embodiment of the invention by a memory system which comprises a semipermanent memory unit, a search unit, a frame select unit, a control unit, a detection unit, and a read-out unit. The semipermanent memory unit features a plurality of planar arrays of plastic sheets stacked one upon the other and a plurality of solenoids, each passing through all the planar arrays. A sheet is divided into four frames. Each frame has four positions and each position comprises a ONE solenoid, a ZERO solenoid and a "return" solenoid. A ONE or a ZERO is stored at a position by encircling the corresponding bit solenoid with an etched winding and bypassing the other bit solenoid with another etched winding.

The frame select unit and the search unit act together to drive selected solenoids in a frame to determine which planes store the search data. The driven solenoid winding acts as a transformer primary and its surrounding windings as secondaries so that each winding which encircles the solenoid will emit a positive pulse and those which bypass the solenoid will emit a ground level. Each plane output is sensed in the detector unit where a positive signal indicates a mismatch and a ground level a match. This unit then consecutively drives each plane where a match was found to read out its data content. The surrounding windings now act as transformer primaries and the solenoid windings as secondaries. The signal on all of the ONE solenoids in the selected frame are read into the read-out unit where their data indication is temporarily stored before being sent to the requesting device which may, for example, be a computer.

Other objects, features, and advantages of the invention will become apparent and its construction and operation will be better understood, from the following detailed description, read in conjunction with the accompanying drawings wherein.

Figure 1:
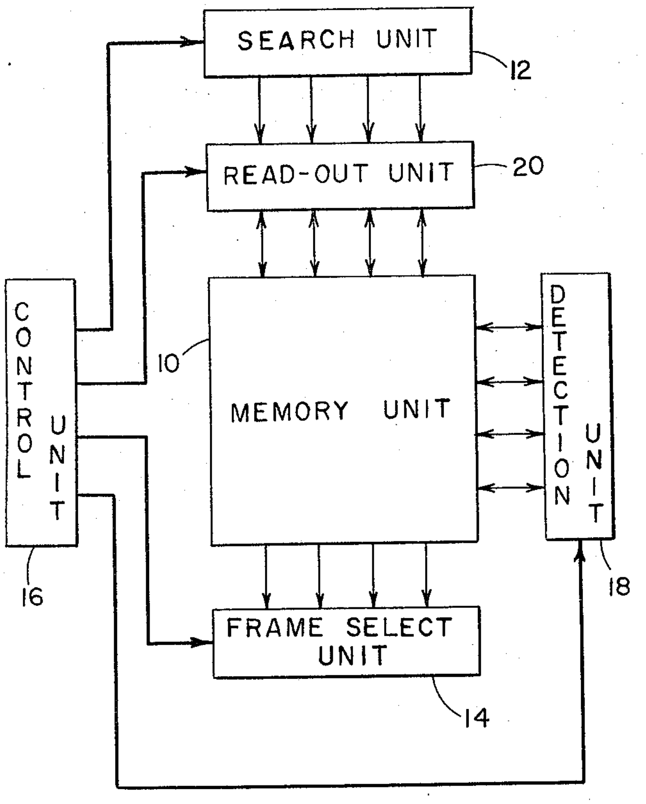
FIG. 1 is a block diagram of an associative memory system embodying the invention.

A block diagram of the various units of the associative memory system is shown in FIG. 1 and comprises a memory unit 10, a search unit 12, a frame select unit 14, a control unit 16, a detection unit 18, and a read-out unit 20. Memory unit 10, shown in FIG. 2, features a plurality of planar arrays of plastic sheets 30, 32, 34 and 36 stacked one upon the other and a plurality of air core solenoids 22, 24, and 26, passing through all planar arrays. All sheets are divided into four frames of information and within each frame are eight pick-up windings arranged in pairs, each of which designates a bit. One winding of each pair surrounds a ONE solenoid 22 and the other a ZERO solenoid 26. As will be explained below, each bit position also includes a return solenoid 24 which is not encircled by the windings. In order to store a ONE at a bit position, one winding is arranged to provide an encircling conductive path around the ONE solenoid 22 and the other a bypass path around the ZERO solenoid 26. Similarly, a ZERO is stored by having one winding provide a conductive path that encircles the ZERO solenoid 26 and the other a path that bypasses the ONE solenoid 22.

The purpose of the associative memory system is to search for certain known information in a designated frame of all the planar arrays, and then to read out all the frame information on those planar arrays which were found to contain the search information. The frame select unit stores the information telling which frame contains the search information, and the search unit stores the search information. These two units acting together drive the solenoids in the memory unit which correspond to the search and frame information. If a ONE is being searched for, the ZERO solenoid 26 is activated; if a ZERO is being searched for, the ONE solenoid 22 is activated. This is done because a positive pulse is emitted by the pickup winding of an encircled solenoid (as is explained in co-pending patent application Ser. No. 302,696, filed August 16, 1963, now abandoned, and entitled "Electronic Memory," which is also assigned to Sylvania Electric Products Inc.), but it is desirable to have no voltage appear at the output when a search finds all bits matching. Hence, if the opposite bit solenoid is driven and there is a match, its winding will be arranged to bypass it and no voltage signal will be emitted. If there is a mismatch, a positive pulse is emitted since the winding encircles the solenoid.

The detection unit 18 senses each plane output and then in consecutive order impresses a signal on those planes which were found to store the search information. This causes each winding on a driven plane to act as a transformer primary and to induce a signal in the winding 28 of its solenoid which describes its bit content (as explained in the above-identified co-pending patent application). The frame select unit 14 allows the information from the selected frame and only that appearing on the ONE solenoids 22 to be read out into read-out unit 20, which temporarily stores the information of this frame.

Control unit 16 controls the transfer of information to and from search unit 12, frame select unit 14, detection unit 18, and read-out unit 20. It should be appreciated that each line from this unit represents a plurality of data control lines as will become evident from the following detailed explanation of the various units of the system.

*Memory unit*

Figure 2:
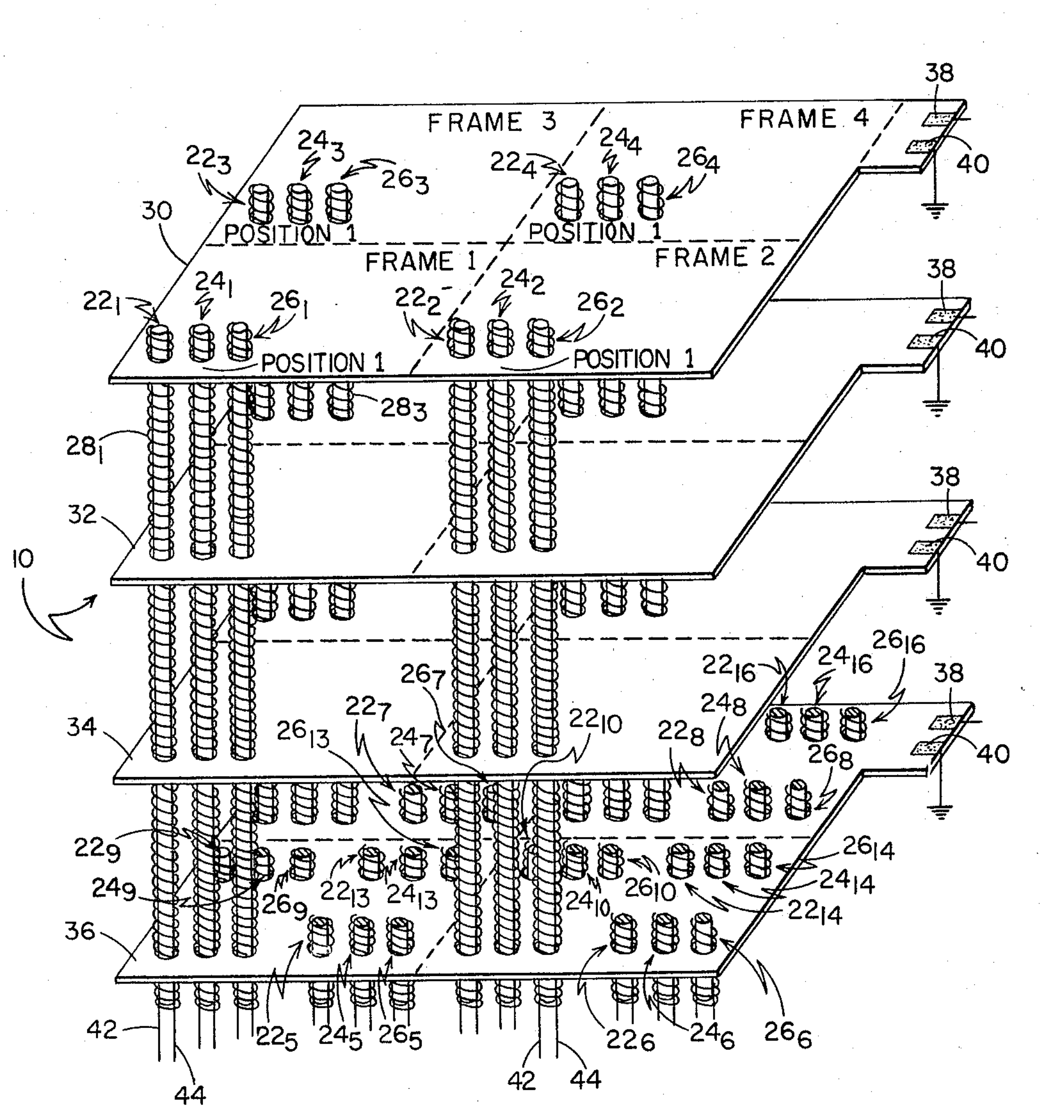
FIG. 2 depicts the layout of the memory unit.
Figure 3:
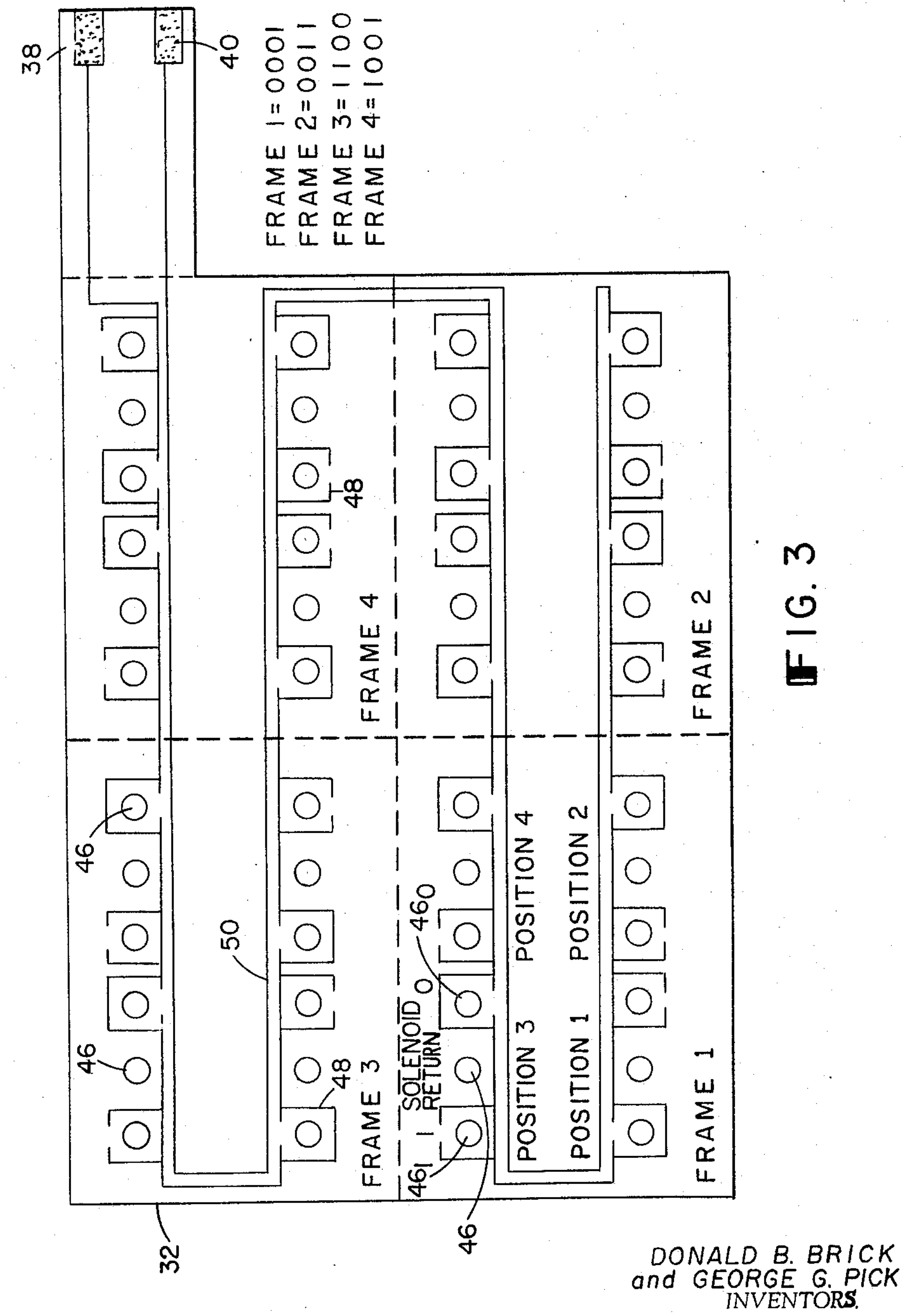
FIG. 3 depicts a memory unit plane.

The layout of memory unit 102 is shown in FIG. 2 and comprises a plurality of stacked planes 30, 32, 34 and 36 and a plurality of solenoids 22, 24, and 26 passing through but not mechanically connected to them. FIG. 3 depicts one plane 30 in detail, comprising a plurality of holes 46, a plurality of etched pickup windings 48 connected in series to form a continuous path 50, and two terminals 38 and 40. The purpose of the holes 46 is to allow the solenoids in the assembled memory 10 to pass through all of the planes. In a typical arrangement two hundred of these planes may be stacked in an inch of space.

Plane 32 is divided into four frames and each frame has four bit positions, each of which contains three holes 46. A full word is stored on each frame. For an illustration of how a position stores a bit, refer to position 3 of frame 1. The hole $46_1$ on the left is for the ONE solenoid 22, the hole 46 in the middle is for the return solenoid 24, and the hole $46_0$ on the right is for the ZERO solenoid 26. In order to store a ZERO, a pickup coil 48 provides a conductive path that encircles the ZERO solenoid hole $46_0$ and another pickup coil 48 provides a path that bypasses the ONE solenoid hole $46_1$. Similarly, to store a ONE, a pickup coil 48 provides a path that encircles the ONE solenoid hole $46_1$ and another one that bypasses the ZERO solenoid hole $46_0$. Thus, it is apparent that position 3 stores a ZERO bit since the ZERO solenoid hole $46_0$ is encircled. In the layout of FIG. 3, the word stored in frame 1 is 0001, the word stored in frame 2 is 0011, the word stored in frame 3 is 1100, and the word stored in frame 4 is 1001.

Memory unit 10 is first searched for certain known information in a selected frame of all planes, and those planes whose data is found to correspond to the search data then have their selected frames read out. The manner in which the various units operate to accomplish this will be explained below under their respective headings. During the search operation the selected solenoids 22 and 26 are driven by search unit 12. As has been explained above, if a ONE is being searched for, the ZERO solenoid 26 is activated; if a ZERO is being searched for, the ONE solenoid 22 is activated. The solenoid winding 28 acts as a transformer primary and the pickup windings 48 surrounding the solenoids act as secondaries. In response to a driving signal, a positive pulse is induced into a pickup winding 48 which encircles its solenoid, and zero voltage is induced into a winding 48 which bypasses its solenoid. Hence, each plane whose information matches the search data will emit a ground level at its output terminal 38. A plane having a mismatch of one or more bits will emit a positive pulse at its output.

Figure 4:
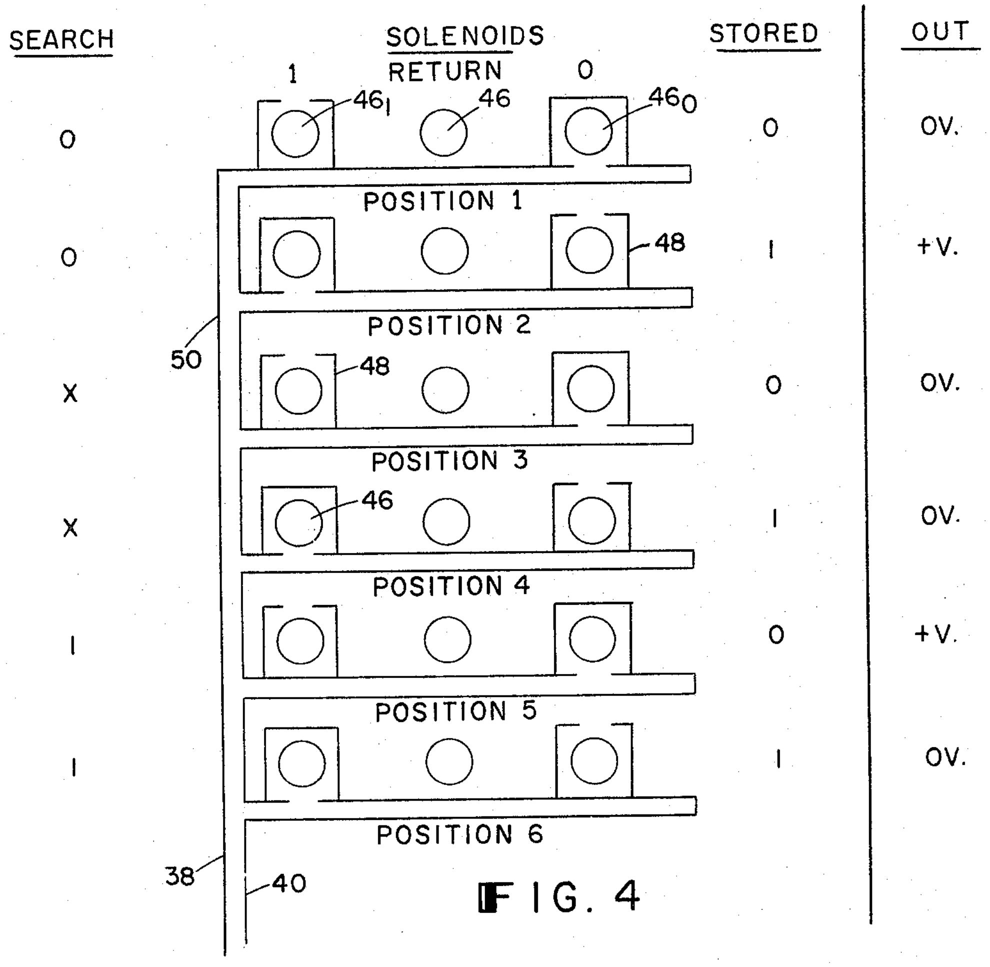
FIG. 4 shows six bit positions and their output response to specific search bits.

FIG. 4 demonstrates this output signal generation for each possible variation in search and stored data. Position 1 stores a ZERO since its ZERO solenoid hole $46_0$ is encircled. If it is assumed that one is searching for a ZERO, the ONE solenoid 22 is activated and a ground level appears at the output 38 indicating a correct match. Position 2 stores a ONE because its ONE solenoid hole $46_1$ is encircled. If one searches it for a ZERO, the ONE solenoid 22 is pulsed and a positive pulse is emitted at the output 38 indicating a mismatch. Position 3 stores a ZERO and position 4 a ONE. In both cases the search criterion is either a ONE or a ZERO, which is called the "don't care" case, so that neither solenoid 22 nor solenoid 26 is activated and no voltage pulse appears at the output 38, the absence of which indicates a match. Position 5 stores a ZERO and it is to be searched for a ONE; therefore, the ZERO solenoid 26 is pulsed and a positive pulse is generated showing a mismatch. Similarly, position 6 stores a ONE and it is to be searched for a ONE. The ZERO solenoid 26 is activated and a ground level is generated at the output 38 to indicate a match.

Referring to FIG. 3, assume that a match of search and stored data was found for frame 1 of plane 32. If, in response to this indication, detection unit 18 impresses a pulse at terminal 38 the windings 48 now act as transformer primaries and the solenoid windings 28 as their secondaries. Each solenoid encircled by its winding 48 picks up a positive pulse and those bypassed by winding 48 pick up a slightly negative voltage. All of these solenoids can now be sensed to read out the full information stored on the plane, but in the embodiment under description, read-out unit 20 senses only the ONE solenoids 22 of the selected frame.

Figure 9:
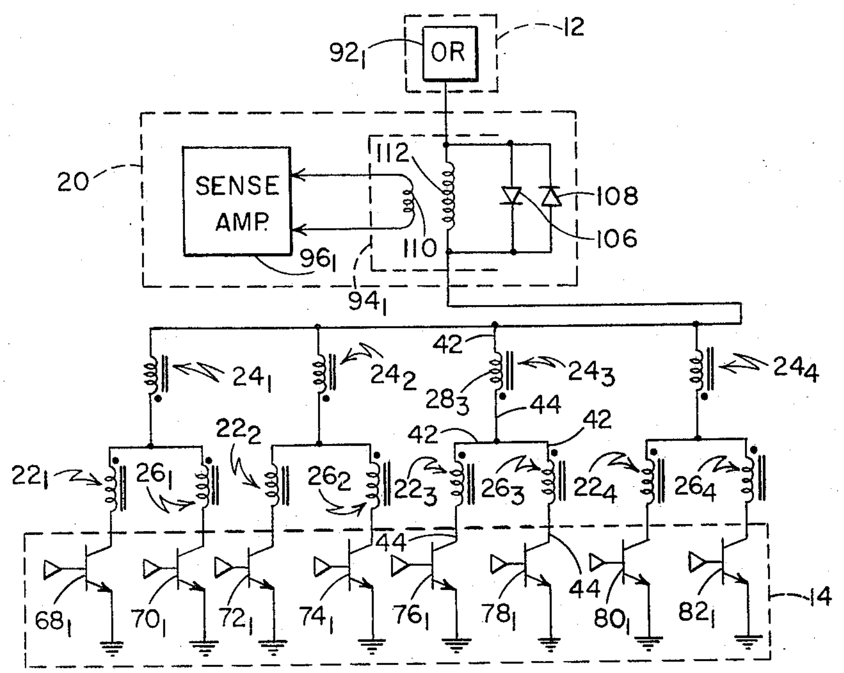
FIG. 9 is a circuit diagram illustrating the manner in which the solenoids of the first position of each frame in the memory unit are electrically connected to each other and to the search unit, the frame select unit, and the read-out unit.

FIG. 9 shows the manner in which the solenoids of the first positions of memory unit 10 are electrically connected to search unit 12, frame select unit 14, and read-out unit 20. It should be appreciated that the other three positions will be similarly arranged. The primary of transformer 94, (see FIG. 7) is connected between OR gate 92, (see FIG. 6) and the parallel combination of flux return solenoids 24. Each solenoid 24 is in turn connected to the parallel combination of its corresponding ZERO solenoid 26 and its ONE solenoid 22. Solenoids 24 never have any pickup coils encircling them because they are not involved in storing data. Their purpose is to cancel stray flux when solenoids 22 and 26 are driven so that those coils 48 external to the energized solenoids 22 and 26 will not pick up any stray signals. Windings 28 of solenoids 24 are oppositely poled to those of the other solenoids 22 and 26 so that the flux generated by solenoids 24 is in opposition to that generated by the others and stray flux cancellation is achieved.

*Frame select unit*

Figure 5:
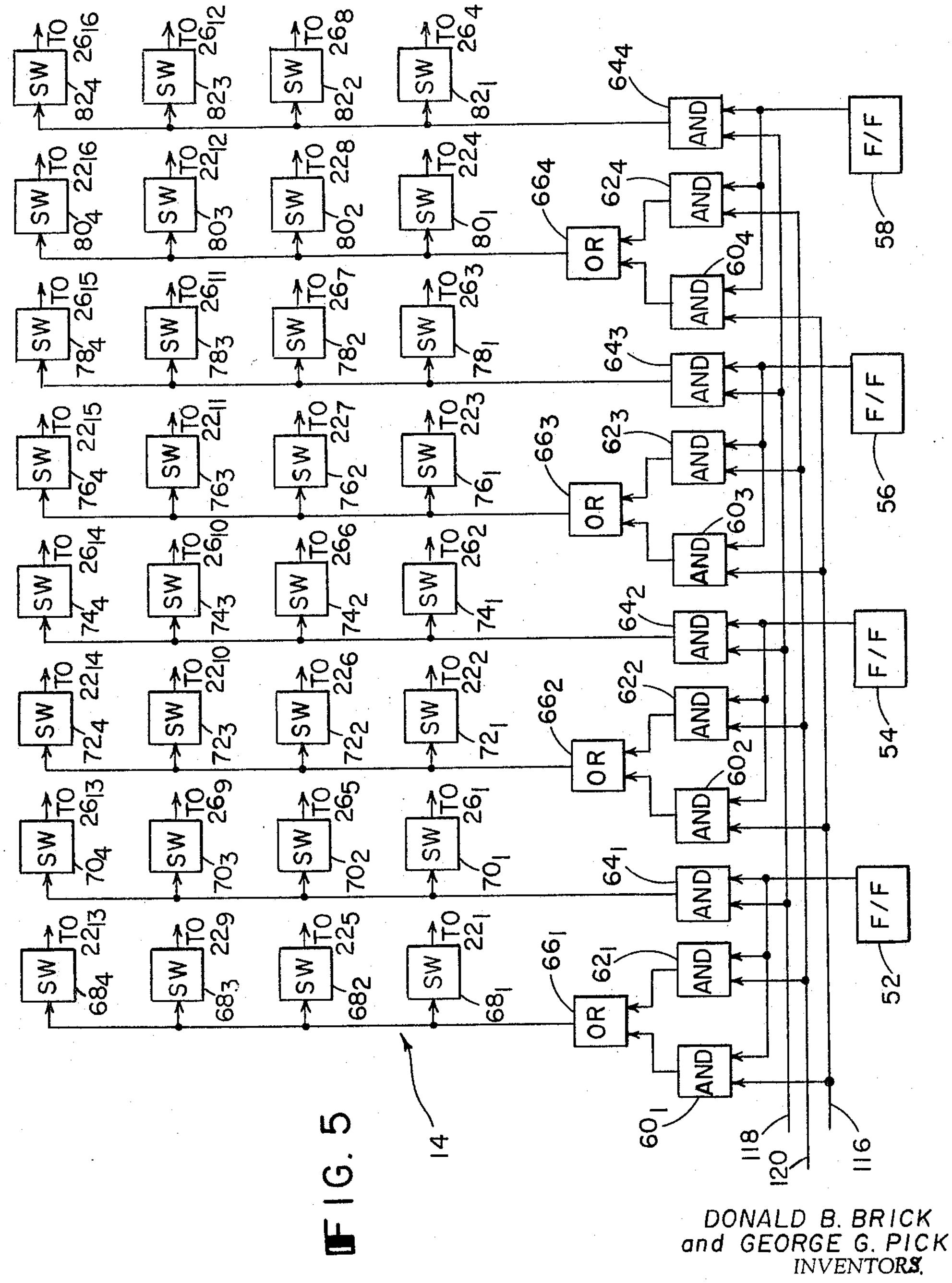
FIG. 5 is a block diagram of an embodiment of the frame select unit.

The frame select unit 14 is shown in FIG. 5. It comprises a logic matrix for selecting the frame to be searched by search unit 12 and also to be read out into read-out unit 20. There are four flip-flops 52, 54, 56, and 58 whose state indicates which frame is to be selected. A set flip-flop 52 means that frame 1 is selected; a set flip-flop 54 that frame 2 is selected; a set flip-flop 56 that frame 3 is selected; and, a set flip-flop 58 that frame 4 is selected. These are set by the requesting device (not shown) and only one flip-flop is set at any given time. Switches 68, 72, 76, and 80 allow the ONE solenoids 22 of memory unit 10 to be activated, whereas switches 70, 74, 78, and 82 allow the ZERO solenoids to be activated.

When the searching action begins, control unit 16 emits a signal on line 116, and only that one of AND gates 60 whose corresponding flip-flop is set will emit a signal. Assume for instance that frame 1 is selected and hence flip-flop 52 is in the set condition. A signal passes from AND gate 60, through OR gate 66, to switches 68, which are transistor switches (see FIG. 9), and turns them ON so that the corresponding ONE solenoids 22 of frame 1 in memory 10 may be energized by search unit 11. Later, a signal may be received on line 118 from control unit 16 causing AND gate 64 to emit a signal which turns ON switches 70 so that the ZERO solenoids 26 of frame 1 may be energized by search unit 12.

After the search operation is finished and the planes are sensed for mismatch of data, control unit 16 emits signal on line 120 which causes AND gate $\mathbf{62_1}$ to send a signal through OR gate 66, to turn ON switches 68. This allows the selected frame information on the different planes whose contents matched the search data to be consecutively read into the read-out unit 20.

*Search unit*

Figure 6:
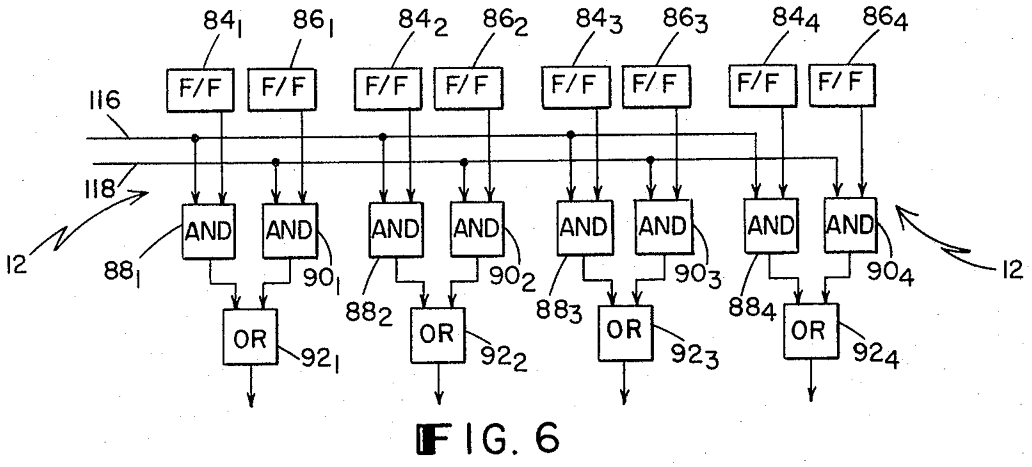
FIG. 6 is a block diagram of an embodiment of the search unit.

The search unit 12 is shown in FIG. 6 and comprises a logic matrix. Flip-flops 84 are set by the requesting device when ONE solenoids 22 of memory 10 are to be driven during the searching operation and flip-flops 86 when the ZERO solenoids 26 are to be driven. Flip-flops $\mathbf{84_1}$ and $\mathbf{86_1}$ select the solenoid to be energized in position 1; flip-flops $\mathbf{84_2}$ and $\mathbf{86_2}$ in position 2; flip-flops $\mathbf{84_3}$ and $\mathbf{86_3}$ in position 3; and, flip-flops $\mathbf{84_4}$ and $\mathbf{86_4}$ in position 4. When a signal is received on line 116 from control unit 16, those AND dates 88 whose corresponding flip-flops 84 are set will send a signal through their associated OR gates 92 to read-out unit 20 which merely acts in this instance to transfer these signals to the correct solenoids. Similarly, when a signal is received on line 118, those AND gates 90 whose corresponding flip-flops 86 are set will send a signal through their associated OR gates 92 to read-out unit 20. Thus, the search unit 12 in accordance with the search data determines which solenoid position within a frame is to be selected and whether the ONE solenoid 22 or the ZERO solenoid 26 within this position is to be driven in each position of that frame which is selected by frame select unit 14.

For illustrative purposes let 10 x 1 be searched in frame 1 of memory 10 so that flip-flops $\mathbf{86_1}$, $\mathbf{84_2}$, and $\mathbf{86_4}$ are in the set condition, recalling that $x$ indicates its don't care case as explained above with reference to FIG. 4. When a signal appears on line 116, AND gate $\mathbf{88_2}$ emits a signal which passes through OR gate $\mathbf{92_2}$, through transformer $\mathbf{94_2}$ (FIG. 7) to solenoid $\mathbf{22_5}$ of memory 10. Similarly, a signal on line 118 activates AND gates $\mathbf{90_1}$ and $\mathbf{90_4}$ which pass a signal through OR gates $\mathbf{92_1}$ and $\mathbf{92_4}$, respectivley, through transformers $\mathbf{94_1}$ and $\mathbf{94_4}$ (FIG. 7) to solenoids $\mathbf{26_1}$ and $\mathbf{26_{13}}$. Those planes whose data stored in frame 1 is either 1011 or 1001 will emit a ground level at their outputs 38 when the ZERO solenoids are driven and when the ONE solenoids 22 are driven while those storing a word having one or more bits which do not match the search word will emit a positive signal at either or both times.

FIG. 9 illustrates the manner in which the position signal from search unit 12 activates its designated solenoid in memory unit 10. Referring to the above example, it is desired to search for a ONE in position 1 of frame 1 so that solenoid $\mathbf{26_1}$ is to be driven. When a signal is received on line 118, transistor switch $\mathbf{70_1}$ turns ON and OR gate $\mathbf{92_1}$ emits a signal which passes through the primary 112 of transformer $\mathbf{94_1}$, through flux return solenoid $\mathbf{24_1}$, through ZERO solenoid $\mathbf{26_1}$, through switch $\mathbf{70_1}$ to ground. None of the other solenoids are energized because their associated transistor switches are in the OFF condition.

*Detection unit*

Figure 8:
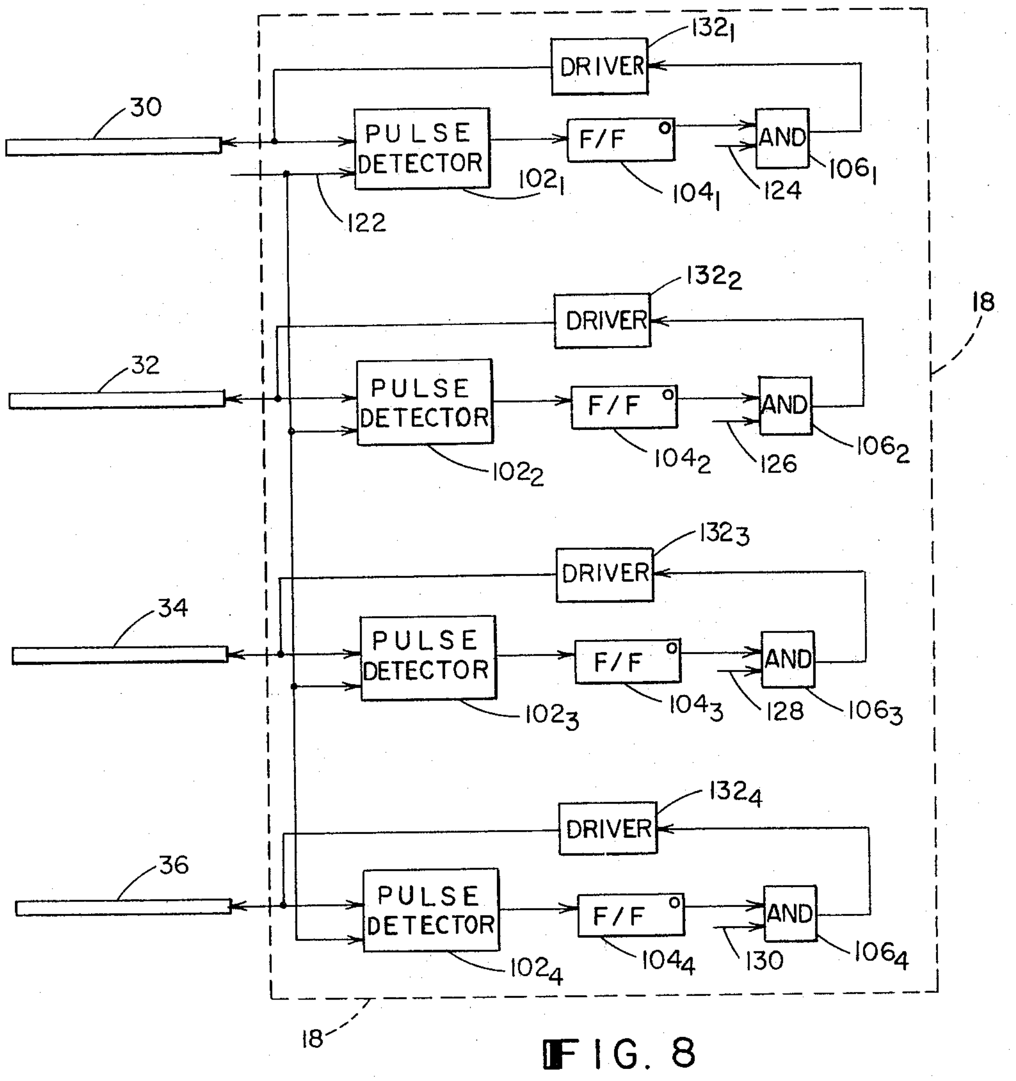
FIG. 8 is a block diagram of an embodiment of the detection unit.

Detection unit 18 is shown in FIG. 8 and comprises four pulse detectors 102, four flip-flops 104, four AND gates 106 and four drivers 132. Pulse detectors 102 sense the outputs of the memory planes when a signal is received on line 122 from control unit 16 to determinne whether there was a mismatch of search and stored information on these planes when the ONE solenoids 22 and when the ZERO solenoids 26 are driven by the search unit 12. A suitable detector may be found in the above-referenced patent applications. Only those detectors 102 which sense a mismatch set their associated flip-flops 104; the others leave their flip-flops in the reset condition. The ZERO side of flip-flops 104 are connected to AND gates 106 so that they will only be allowed to generate a signal if no mismatch condition was found. The output signals from AND gates 106 are received by drivers 132 which drive terminals 38 of their corresponding planes so that the full selected frame on the matching planes may be read-out into read-out unit 20.

For an example of the manner in which this unit functions, let a match have occurred on planes 32 and 36. Consequently, pulse detector $\mathbf{102_1}$ sets flip-flop $\mathbf{104_1}$ and pulse detector $\mathbf{102_3}$ sets flip-flop $\mathbf{104_3}$. Flip-flops $\mathbf{104_2}$ and $\mathbf{104_4}$ remain in their reset condition. Control unit 16 first sends a signal to AND gate 106 on line 124, but it does not emit a signal since flip-flop $\mathbf{104_1}$ is set. Consequently, plane 30 is not driven and no information is read out from that plane into read-out unit 20.

Later a signal is received from control unit 16 on line 126 causing AND gate $\mathbf{106_2}$ to emit a signal since flip-flop $\mathbf{104_2}$ is in the reset condition. This signal is received at terminal 38 of plane 32 so that its selected frame information may be read out. The output signal from AND gate $\mathbf{106_2}$ is not detected by pulse detector $\mathbf{102_2}$ because line 122 has no signal present. Similarly, when a signal is received on line 128, AND gate $\mathbf{106_3}$ is not activated and plane 34 is not driven. Still later in time when a signal is received on line 130, AND gate $\mathbf{106_4}$ sends a signal back driving plane 36 and its selected frame information is read into read-out unit 20.

*Read-out unit*

Figure 7:
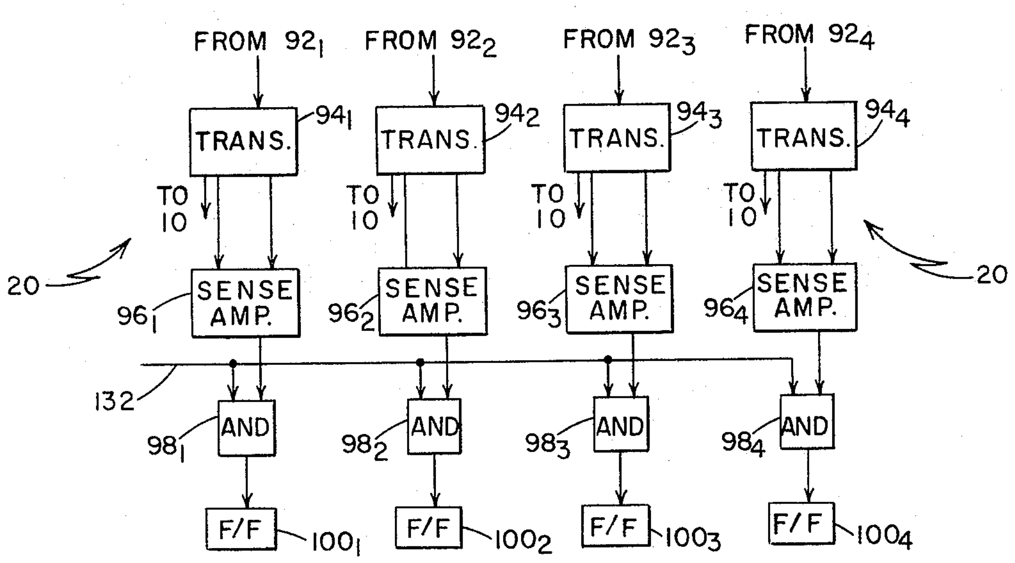
FIG. 7 is a block diagram of an embodiment of the read-out unit.

Read-out unit 22 is shown in FIG. 7 and comprises four sensing transformers 94, four sense amplifiers 96, four AND gates 98, and four flip-flops 100. As mentioned previously under the Frame Select Unit heading, the frame select unit 14 allows only one frame to be read out at any time and only the ONE solenoids in that frame are sensed by the read-out unit 22. When a plane is driven by detection unit 18 and the frame is selected by frame select unit 14, those ONE solenoids whose windings on the driven plane encircle them will have a positive pulse induced in their solenoid windings 28. These pulses are picked up in transformers 94, and sensed and shaped by sense amplifiers 96. When a signal is received on line 132 from control unit 16, those AND gates 98 having a positive signal on their other input are enabled causing their corresponding flip-flops 100 to be set and the frame data is stored. This is transferred to the requesting device before the next plane is capable of being driven by detector unit 18.

For an example of the operation of read-out unit 20, let plane 32 be driven by detector unit 18 and frame 1 be selected. FIG. 3 shows the contents of frame 1 to be 0001. Hence, only ONE solenoid $22_1$ will have a position pulse induced in its winding 28 when plane 32 is driven. This will be picked up in transformer $94_1$ and amplified and shaped by sense amplifier $96_1$. When a signal is received on line 132, AND gate $98_1$ sets flip-flop $100_1$. Refer to FIG. 9 for the manner in which this positive signal is transferred to read-out unit 20. One side of solenoid $22_1$ is connected through ON transistor $68_1$ to ground. As plane 32 is driven, a positive pulse appears in winding 28 of solenoid $22_1$ which passes through winding 28 of solenoid $24_1$ to primary 112 of transformer $94_1$. It is then picked up by its secondary 110.

*Control unit*

Control unit 16 comprises a logic matrix (not shown) for controlling the transfer of information within and between the various units of the system.

It should be appreciated that the invention is not limited to the specifics of the preferred embodiment described herein. For instance, the data planes need not be plastic sheets and the elongated solenoids need not be of the air core type. The referenced patent applications may be referred to for a few possible alternative embodiments of these devices. Also the triple solenoid position could be replaced by a double position if the drive were bi-polar and the windings on the solenoids were wound oppositely. Any type circuit which distinguishes between a positive and a negative signal could be used in the detection unit.

If only the search identifier and not the frame were specified, in view of the above description it would be possible for anyone skilled in the memory art to arrange for the searching of all frames. Similarly, although a single frame only is read, such a person could readily implement the necessary circuitry to read out any part or all of a plane. Consequently, the invention is not limited to the specifics of the preceding explanation and embraces the full scope of the following claims.

What is claimed is:

1. Memory apparatus for storing a plurality of data bits comprising: a plurality of first solenoids; a plurality of second solenoids; and, a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids.

2. The invention according to claim 1 and wherein: a pair represents a ONE when said first solenoid winding encircles said first solenoid and said second solenoid winding bypasses said second solenoid and represents a ZERO when said first solenoid winding bypasses said first solenoid and said second solenoid winding encircles said second solenoid.

3. The invention according to claim 1 and wherein: a plurality of signal transfer paths are formed by a combination of said winding pairs.

4. A memory system which comprises: a plurality of first solenoids; a plurality of second solenoids; a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids, and a plurality of signal transfer paths being formed by a combination of said winding pairs; means for selectively driving one solenoid only of selected pairs; and, means connected to each signal transfer path for sensing the response of the windings in said paths to said solenoid driving action.

5. A memory system which comprises: a plurality of first solenoids; a plurality of second solenoids; a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids, and a plurality of signal transfer paths being formed by a combination of said winding pairs; means for selectively driving one solenoid only of selected pairs; means connected to each signal transfer path for detecting those paths having a selected response to said solenoid driving action and for driving said detected paths; and, means connected to said solenoids for sensing the response of said solenoids to said path driving action.

6. A memory system which comprises: a plurality of first solenoids; a plurality of second solenoids; a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids, and a plurality of signal transfer paths being formed by a combination of said winding pairs; means for selectively driving one solenoid only of selected pairs; means connected to each signal transfer path for detecting those paths having a selected response to said solenoid driving action and for driving said detected paths; and, means connected to said first solenoids for sensing the response of said first solenoids to said path driving action.

7. A memory system which comprises: a plurality of first solenoids: a plurality of second solenoids; a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids, and a plurality of signal transfer paths being formed by a combination of said winding pairs; means for selectively driving said winding paths; and, means connected to said solenoids for sensing the response of selected ones of said solenoids to said path driving action.

8. A memory system which comprises: a plurality of first solenoids; a plurality of second solenoids; a plurality of electrically conductive windings each linking one of said solenoids in inductive signal transfer relationship and being arranged in pairs, each pair selectively arranged for representing a data bit and having one winding linking one of said first solenoids and the other winding linking one of said second solenoids, and a plurality of signal transfer paths being formed by a combination of said winding pairs; means for selectively driving said winding paths; and, means connected to said first solenoids for sensing the response of said first solenoids to said path driving action.

9. An associative memory system which comprises: a memory unit having a plurality of data planes, a plurality of elongated solenoids each passing through all of said planes, and a plurality of windings located on said planes and each arranged around one of said solenoids; a searching unit arranged to selectively drive certain ones of said solenoids in accordance with data stored therein; and, detection means connected to each of said planes to sense the response of said windings on each plane to said driving action so as to determine which ones of said planes store data corresponding to the search data.

10. An associative memory system which comprises: a memory unit having a plurality of data planes, a plurality of elongated solenoids each passing through all of said planes, and a plurality of windings located on said planes each arranged around one of said solenoids; a searching unit arranged to selectively drive certain ones of said solenoids in accordance with data stored therein; means connected to each of said planes to sense the response of said windings on each plane to such driving action so as to determine which of said planes store data matching the search data; means for consecutively driving said matching planes; and, read-out means connected to said solenoids for sensing the response of said solenoids to said plane driving action, interpreting said response, and storing a data indication of the information stored in each of said driven planes.

11. A memory system which comprises: a memory unit having a plurality of data planes, a plurality of elongated solenoids each passing through all of said planes, and a plurality of windings located on said planes each being arranged around one of said solenoids; means for driving selected ones of said planes in consecutive order; and, read-out means connected to said solenoids for sensing the response of said solenoids to said plane driving action, interpreting said response, and storing a data indication of the information stored in each of said driven planes.

12. An associative memory system which comprises: a memory unit having a plurality of data planes each divisible into a plurality of frames, a plurality of elongated solenoids each passing through all of said planes, and a plurality of windings located on said planes and each arranged around one of said solenoids; means arranged to selectively drive certain ones of said solenoids in one of said frames in accordance with data stored therein; and, detection means connected to each of said planes to sense the response of said windings on each plane to said driving action so as to determine those ones of said planes storing data correponding to said search data.

13. An associative memory system which comprises: a memory unit having a plurality of data planes each divisible into a plurality of frames, a plurality of elongated solenoids each passing through all of said planes and each arranged around one of said solenoids; means arranged to selectively drive certain ones of said solenoids in one of said frames in accordance with data stored therein; means connected to each of said planes for sensing the response of said windings on each plane to such driving action so as to determine which ones of said planes store data matching said search data; means for consecutively driving said matching planes; and, read-out means connected to said solenoids for sensing the response of the solenoids in said frame to said plane driving action, interpreting said response, and storing a data indication of the information stored in said frame of each of said driven planes.

14. Data processing apparatus comprising: a plurality of solenoids; a separate plurality of electrically conductive windings each linking one of said solenoids in inductive signal transfer relationship; a plurality of bit transfer paths each comprising a series combination of a plurality of said conductive windings; and, means connected to said solenoids and arranged for cancelling stray flux generated by said solenoids.

15. Data processing apparatus comprising: a plurality of solenoids; a separate plurality of electrically conductive windings each linking one of said solenoids in inductive signal transfer relationship; a plurality of bit transfer paths each comprising a series combination of a plurality of said conductive windings; and, solenoid means connected to said solenoids and arranged for cancelling stray flux generated by said solenoids.

No references cited.

ROBERT C. BAILEY, *Primary Examiner.*

I. S. KAVRUKOV, *Assistant Examiner.*